(12) United States Patent
Suzuki et al.

(10) Patent No.: US 12,434,762 B2
(45) Date of Patent: Oct. 7, 2025

(54) VEHICLE DRIVING SUPPORT APPARATUS

(71) Applicant: SUBARU CORPORATION, Tokyo (JP)

(72) Inventors: Tatsuro Suzuki, Tokyo (JP); Hiroaki Kuramochi, Tokyo (JP); Satoshi Nakano, Tokyo (JP); Masashi Okano, Tokyo (JP); Shuhei Dairokuno, Tokyo (JP); Motohiro Hidaka, Tokyo (JP); Katsuyuki Umezawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 439 days.

(21) Appl. No.: 18/067,405

(22) Filed: Dec. 16, 2022

(65) Prior Publication Data
US 2023/0227100 A1  Jul. 20, 2023

(30) Foreign Application Priority Data
Jan. 18, 2022 (JP) ................................. 2022-005993

(51) Int. Cl.
  B62D 6/00  (2006.01)
  B62D 5/04  (2006.01)
(52) U.S. Cl.
  CPC .............. B62D 6/00 (2013.01); B62D 5/0421 (2013.01); B62D 5/0463 (2013.01)
(58) Field of Classification Search
  CPC ....... B62D 6/00; B62D 5/0421; B62D 5/0463
  USPC ...................................................... 180/446
  See application file for complete search history.

(56) References Cited

U.S. PATENT DOCUMENTS

| | | | |
|---|---|---|---|
| 2018/0037260 A1* | 2/2018 | Otake .................. | G05D 1/0055 |
| 2019/0039648 A1* | 2/2019 | Kitta .................... | B62D 5/0463 |
| 2021/0081690 A1* | 3/2021 | Inagaki ................ | G06V 40/161 |

FOREIGN PATENT DOCUMENTS

| | | | |
|---|---|---|---|
| JP | 2009101714 A | * | 5/2009 |
| JP | 2010100120 A | * | 5/2010 |
| JP | 2013-041523 A | | 2/2013 |
| JP | 2019-112028 A | | 7/2019 |

(Continued)

OTHER PUBLICATIONS

Office Action dated Jul. 29, 2025, issued in corresponding Japan Patent Application No. 2022-005993, 5 pages.

*Primary Examiner* — Jacob D Knutson
*Assistant Examiner* — Mohamed M Medani
(74) *Attorney, Agent, or Firm* — Rimon P.C.

(57) ABSTRACT

A vehicle driving support apparatus includes a forward environment recognizing device configured to recognize a traveling environment forward of a vehicle, a control device configured to perform active lane keep centering control based on the traveling environment, an electric power steering device configured to apply an assist torque to control a turning angle of wheels in accordance with a steering angle received from a steering handle, and a driver monitoring system configured to detect biological information of a driver who drives the vehicle. During execution of the active lane keep centering control, the control device is configured to count the number of times a driver's line-of-sight direction in the biological information has deviated from a target route direction of the vehicle and if the counted number of times is greater than or equal to a predetermined threshold count, reduce the assist torque stepwise as the counted number of times increases.

6 Claims, 4 Drawing Sheets

(56) References Cited

FOREIGN PATENT DOCUMENTS

| JP | 2020-032776 A | 3/2020 |
|----|---------------|--------|
| JP | 2021-018665 A | 2/2021 |

\* cited by examiner

VEHICLE DRIVING SUPPORT APPARATUS

CROSS-REFERENCE TO RELATED APPLICATIONS

The present application claims priority from Japanese Patent Application No. 2022-005993 filed on Jan. 18, 2022, the entire contents of which are hereby incorporated by reference.

BACKGROUND

The disclosure relates to a vehicle driving support apparatus that has an active lane keep centering control function.

Driving support apparatuses that support driving operation of drivers who drive vehicles, such as automobiles, have been put to practical use in recent years. This is to reduce drivers' burden in driving operation and achieve improved safety.

Such a driving support apparatus has, for example, a manual driving mode where steering, acceleration, and deceleration are performed in accordance with an intentional driving operation of a driver, a driving support mode where steering support control and acceleration and deceleration control are performed on the basis of an intentional driving operation of the driver, and a driving support mode (so-called autonomous driving mode) for driving the vehicle without driver's driving operation.

Driving support control in each driving support mode is performed, for example, by an adaptive cruise control (ACC) function and an active lane keep centering (ALKC) control function. The driving support control allows the vehicle to autonomously travel in a traffic lane while keeping a distance to the preceding vehicle.

As a control technique that further improves safety, for example, Japanese Unexamined Patent Application Publication (JP-A) No. 2010-100120 discloses a vehicle driving support apparatus with a steering controller that corrects a base value of output steering torque on the basis of the direction of driver's focus.

This driving support apparatus of the related art compares the direction of driver's focus with the direction of the vehicle's travel path at a predetermined look-ahead distance. Then, if the driver is distracted and deviation of the direction of driver's focus from the vehicle's travel path is greater than or equal to a predetermined threshold, the driving support apparatus makes a correction that increases the output steering torque to change the driver's steering feel in accordance with the driver's line-of-sight direction and the vehicle's travel direction.

JP-A No. 2009-101714 discloses another driving support apparatus. If alertness of the driver is low, this driving support apparatus of the relater art makes the handle feel heavier, as well as applying brakes. The driving support apparatus includes a vehicle controller that performs control to make steering less effective, so that the driver uses a large amount of force to perform steering operation. This allows the driver to notice that his or her ability to drive has fallen.

If the driver is looking aside and the driver's line of sight does not agree with the direction of steering during the active lane keep centering control, the driving support apparatus of the related art determines that the driver's attention may be distracted. Then, if determining that the vehicle may have been erroneously steered off the designated traveling route, the driving support apparatus makes the steering handle feel heavier to alert the driver.

As described above, when the driver's line of sight does not agree with the direction of steering during the active lane keep centering control, the driving support apparatus of the related art performs control that increases the torque for turning the steering handle, so that the driver is alerted.

SUMMARY

A vehicle driving support apparatus according to an aspect of the disclosure includes a forward environment recognizing device, a control device, an electric power steering device, and a driver monitoring system. The forward environment recognizing device is configured to recognize a traveling environment forward of a vehicle. The control device is configured to perform active lane keep centering control based on the traveling environment recognized by the forward environment recognizing device. The electric power steering device is configured to apply an assist torque to control a turning angle of wheels of the vehicle in accordance with a steering angle received from a steering handle of the vehicle. The driver monitoring system is configured to detect biological information of a driver who drives the vehicle. The control device is configured to: during performing the active lane keep centering control, count a number of times a line-of-sight direction of the driver in the biological information has deviated from a target route direction of the vehicle; when the counted number of times is greater than or equal to a predetermined threshold count, reduce the assist torque of the electric power steering device stepwise as the counted number of times increases.

A vehicle driving support apparatus according to an aspect of the disclosure includes a sensor, a circuitry, an electric power steering device, and a driver monitoring system. The sensor is configured to recognize a traveling environment forward of a vehicle. The circuitry is configured to perform active lane keep centering control based on the traveling environment recognized by the sensor. The electric power steering device is configured to apply an assist torque to control a turning angle of wheels of the vehicle in accordance with a steering angle received from a steering handle of the vehicle. The driver monitoring system includes a sensor and is configured to detect biological information of a driver who drives the vehicle. The circuitry is configured to: during performing the active lane keep centering control, count a number of times a line-of-sight direction of the driver in the biological information has deviated from a target route direction of the vehicle; when the counted number of times is greater than or equal to a predetermined threshold count, reduce the assist torque of the electric power steering device stepwise as the counted number of times increases.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

DETAILED DESCRIPTION

If the driver is distracted and the driver's line of sight differs from the traveling route, the driving support apparatus of the related art makes the steering handle feel heavier. However, this is insufficient to alert the driver.

Accordingly, it is desirable to prevent deviation from lane lines during execution of the active lane keep centering control function, and clearly alert the driver that he or she is being distracted.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, numbers of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
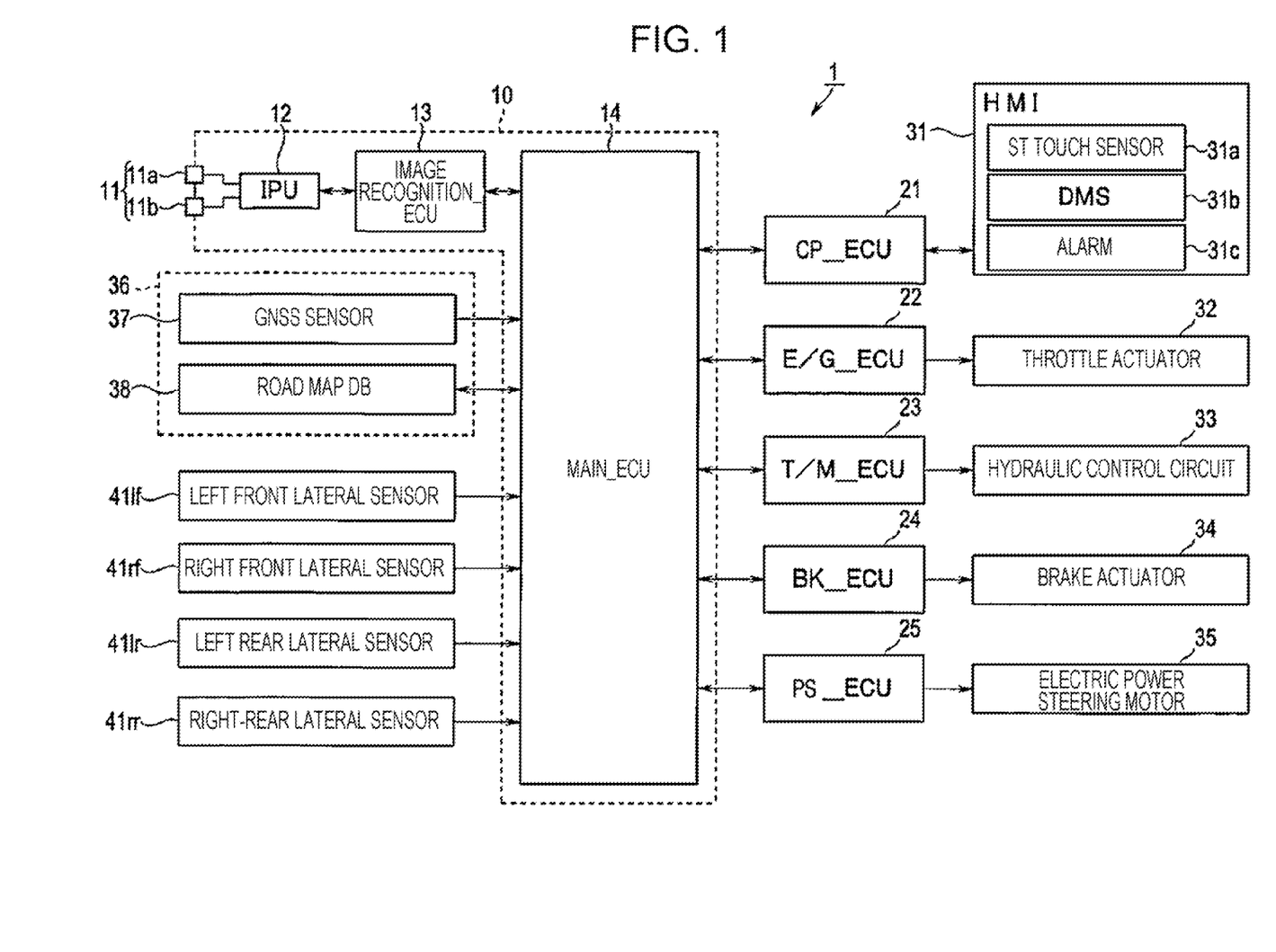
FIG. 1 is a diagram illustrating a general configuration of a vehicle driving support apparatus.

The embodiment of the disclosure will now be described with reference to the drawings. The drawings are related to one embodiment of the disclosure. FIG. 1 is a diagram illustrating a general configuration of a driving support apparatus.

As illustrated in FIG. 1, a driving support apparatus 1 includes, for example, a camera unit 10 secured to the center of a front upper part of the interior of a vehicle M. In one embodiment, the camera unit 10 may serve as a "forward environment recognizing device".

The camera unit 10 includes a stereo camera 11, an image processing unit (IPU) 12, an image recognition unit (image recognition_ECU) 13, and a main controller (main_ECU) 14 serving as a traveling control unit which is a main traveling control device.

Figure 2:
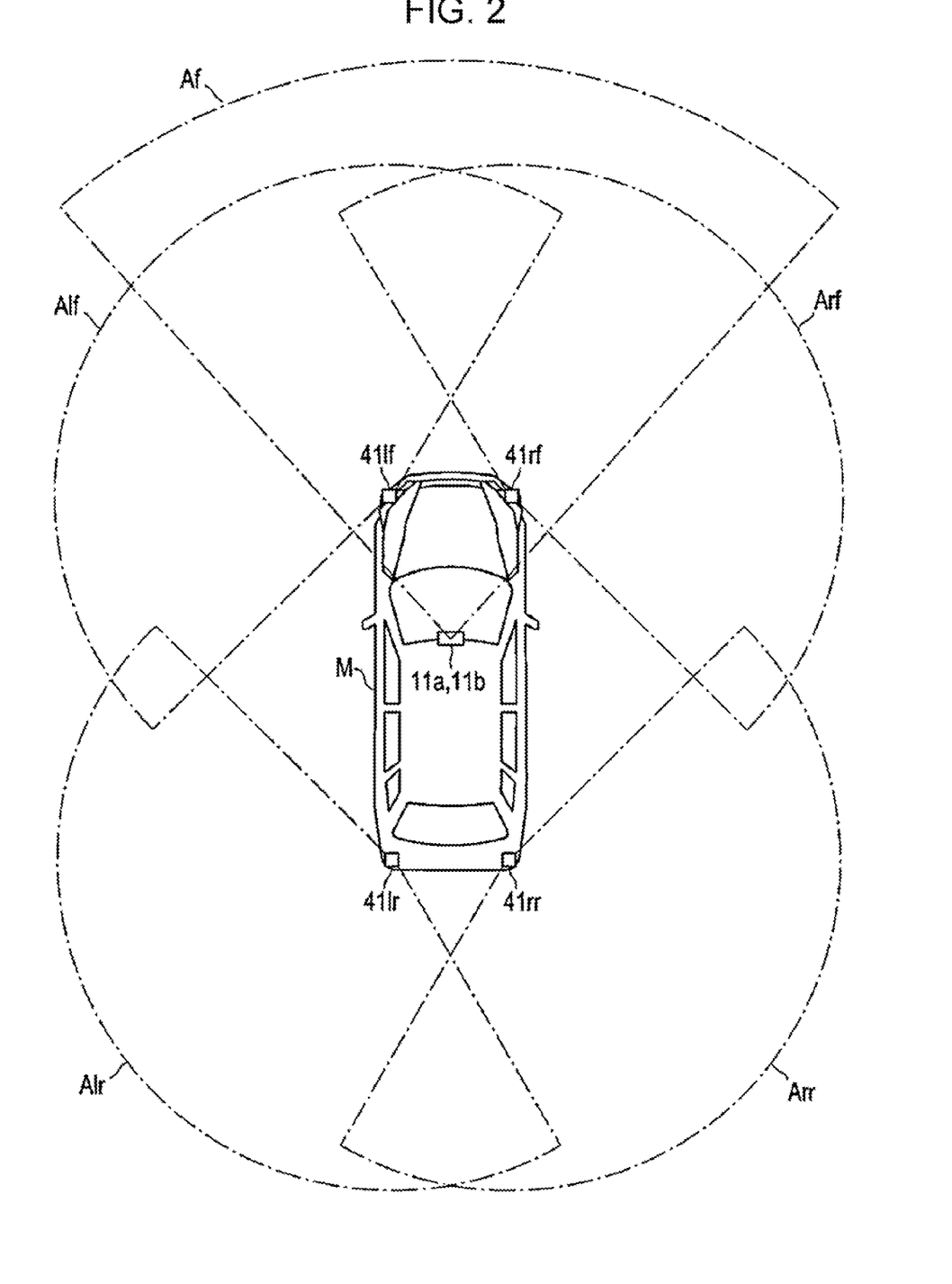
FIG. 2 is an explanatory diagram illustrating areas monitored by a stereo camera, and radars.

The stereo camera 11, which is a forward environment recognizing camera, includes a main camera 11a and a sub-camera 11b. For example, the main camera 11a and the sub-camera 11b are symmetrically arranged right and left, with the center of the vehicle M in the width direction therebetween. The main camera 11a and the sub-camera 11b each include, for example, a complementary metal oxide semiconductor (CMOS) sensor. The main camera 11a and the sub-camera 11b stereoscopically capture a traveling environment in an area Af (see FIG. 2) in front of the vehicle M from different viewpoints, at predetermined intervals synchronized with each other.

The traveling environment images captured by the stereo camera 11 are processed in a predetermined manner by the IPU 12. The IPU 12 detects the edges of various objects, such as three-dimensional objects and lane lines on the road surface, appearing in the images. The IPU 12 determines range information from the amount of positional displacement between corresponding edges in the right and left images, and generates image information (range image information) including the range information.

On the basis of the range image information received from the IPU 12, for example, the image recognition_ECU 13 determines the road curvature (1/m) of the right and left lane lines defining the traveling path (vehicle traveling path) along which the vehicle M travels, and also determines the distance between the right and left lane lines (lane width).

Various ways of determining the road curvature and the lane width are known. For example, to determine the road curvature, the image recognition_ECU 13 binarizes the traveling environment information by using a luminance difference to recognize the right and left lane lines, and solves a curve approximation equation using the least squares method to determine the curvature of the right and left lane lines for each predetermined section. Also, the image recognition_ECU 13 calculates the lane width from a difference in curvature between the right and left lane lines.

Then, on the basis of the curvature of the right and left lane lines and the lane width, the image recognition_ECU 13 calculates, for example, the lane center and the vehicle's lateral deviation, which is the distance from the lane center to the center of the vehicle M in the vehicle width direction.

Also, the image recognition_ECU 13 performs, for example, predetermined pattern matching on the range image information to recognize three-dimensional objects, such as nearby vehicles and guardrails and curbs along the road.

To recognize a three-dimensional object, the image recognition_ECU 13 recognizes, for example, the type of the three-dimensional object, the height of the three-dimensional object, the distance to the three-dimensional object, the moving speed of the three-dimensional object, and a relative speed between the three-dimensional object and the vehicle M.

These various types of information recognized by the image recognition_ECU 13 are output as traveling environment information to the main_ECU 14.

In the present embodiment, along with the stereo camera 11 and the IPU 12, the image recognition_ECU 13 serves as a traveling environment recognizer that recognizes information about a traveling environment outside the vehicle M.

The main_ECU 14 is a control unit for controlling the overall operation of the driving support apparatus 1.

The main_ECU 14 is coupled to various control units through an in-vehicle communication network, such as a controller area network (CAN). The control units include a cockpit control unit (CP_ECU) 21, an engine control unit (E/G_ECU) 22, a transmission control unit (T/M_ECU) 23, a brake control unit (BK_ECU) 24, and a power steering control unit (PS_ECU) 25.

The main_ECU 14 is also coupled to various sensors including a locator unit 36, a left-front lateral sensor 41lf and a right-front lateral sensor 41rf each serving as a forward environment recognizing device which is a traveling environment recognizing sensor on the front side, and a left-rear lateral sensor 41lr and a right-rear lateral sensor 41rr each serving as a rearward environment recognizing device which is a traveling environment recognizing sensor on the rear side.

The CP_ECU 21 is coupled to a human machine interface (HMI) 31 disposed around a driving seat.

The HMI 31 includes, for example, switches used to instruct execution of various types of driving support control, a mode selection switch for switching the driving support mode, a steering touch sensor 31a configured to detect the steering-holding state of the driver, a driver monitoring system (DMS) 31*b* configured to perform face recognition of the driver and detect the driver's line of sight, an alarm 31*c* serving as a warning device, a touch panel display, a combination meter, and a speaker.

Upon receiving a control signal from the main_ECU 14, the CP_ECU 21 appropriately provides various types of displayed or audio information through the HMI 31 to the driver. The information provided to the driver includes, for example, various warnings about the presence of the preceding vehicle, the state of implementation of driving support control, and various types of information about the traveling environment of the vehicle M.

The CP_ECU 21 outputs, to the main_ECU 14, various types of input information received from the driver through the HMI 31. The input information includes, for example, an on/off state of each driving support control.

The E/G_ECU 22 is coupled on the output side thereof to a throttle actuator 32 for actuating an electronically controlled throttle. The E/G_ECU 22 is coupled on the input side thereof to various sensors including an accelerator sensor (not illustrated).

The E/G_ECU 22 drives and controls the throttle actuator 32 on the basis of a control signal from the main_ECU 14 or detection signals from various sensors. The E/G_ECU 22 thus regulates the intake air volume of the engine and generates a desired engine output. Also, the E/G_ECU 22 outputs a signal of detected accelerator position and other signals from various sensors to the main_ECU 14.

The T/M_ECU 23 is coupled on the output side thereof to a hydraulic control circuit 33. The T/M_ECU 23 is coupled on the input side thereof to various sensors including a shift position sensor (not illustrated). On the basis of a signal of engine torque estimated by the E/G_ECU 22 or detection signals from various sensors, the T/M_ECU 23 performs hydraulic control for the hydraulic control circuit 33. This allows the T/M_ECU 23 to operate frictionally engaged elements and pulleys in the automatic transmission, and change the engine output at a desired transmission gear ratio.

The T/M_ECU 23 outputs a signal of detected shift position and other signals from various sensors to the main_ECU 14.

The BK_ECU 24 is coupled on the output side thereof to a brake actuator 34 for regulating the brake hydraulic pressure output to a brake wheel cylinder on each wheel. The BK_ECU 24 is coupled on the input side thereof to various sensors, such as a brake pedal sensor, a yaw rate sensor, front and rear acceleration sensors, and a vehicle speed sensor (not illustrated).

The BK_ECU 24 drives and controls the brake actuator 34 on the basis of a control signal from the main_ECU 14 or detection signals from various sensors. The BK_ECU 24 thus appropriately produces brake force in each wheel for forced braking control or yaw rate control of the vehicle M.

The BK_ECU 24 outputs signals of brake operation state, yaw rate, forward and backward acceleration, and vehicle speed (speed of the vehicle M) detected by various sensors to the main_ECU 14.

The PS_ECU 25 is coupled on the output side thereof to an electric power steering (EPS) motor 35 that applies a steering torque of motor rotation to a steering mechanism. Also, the PS_ECU 25 is coupled on the input side thereof to various sensors, such as a steering torque sensor 40*a* and a steering angle sensor 53*a* (see FIG. 3).

The PS_ECU 25 drives and controls the electric power steering motor 35 on the basis of a control signal from the main_ECU 14 or detection signals from various sensors. The PS_ECU 25 thus produces a steering torque for the steering mechanism.

The PS_ECU 25 outputs signals of steering torque and steering angle detected by various sensors to the main_ECU 14.

The locator unit 36 includes a global navigation satellite system (GNSS) sensor 37 and a high-precision road map database (road map DB) 38.

The GNSS sensor 37 receives positioning signals transmitted from positioning satellites to determine the location (including latitude, longitude, and altitude) of the vehicle M.

The road map DB 38 is a mass storage medium, such as a hard disk drive (HDD), and stores high-precision road map information (dynamic map). As lane data used for autonomous driving, the road map DB 38 holds, for example, lane width data, lane center position coordinate data, lane azimuth angle data, and speed limit data.

The lane data is stored, for each lane, at intervals of several meters on the road map. The road map DB 38 holds information about various facilities and parking spaces. For example, on the basis of a request signal from the main_ECU 14, the road map DB 38 outputs road map information of a specified range, with respect to the position of the vehicle M determined by the GNSS sensor 37, as traveling environment information to the main_ECU 14.

In the present embodiment, along with the GNSS sensor 37, the road map DB 38 serves as a traveling environment recognizer that recognizes information about a traveling environment outside the vehicle M.

The left-front lateral sensor 41*lf* and the right-front lateral sensor 41*rf* are each constituted by a sensor, such as a light detection and ranging (LiDAR) sensor or a millimeter-wave radar. The left-front lateral sensor 41*lf* and the right-front lateral sensor 41*rf* are disposed, for example, on the left and right sides, respectively, of a front bumper.

The left-front lateral sensor 41*lf* and the right-front lateral sensor 41*rf* detect three-dimensional objects that cannot be easily recognized in images captured by the stereo camera 11. That is, by the left-front lateral sensor 41*lf* and the right-front lateral sensor 41*rf*, three-dimensional objects in areas Alf and Arf (see FIG. 2) in front and to the left and right of the vehicle M are recognized as traveling environment information.

The left-front lateral sensor 41*lf* and the right-front lateral sensor 41*rf* may be replaced by a single LiDAR sensor that is capable of covering a wide area in front and to the left and right of the vehicle M. A LiDAR sensor capable of covering a wide area in front and to the left and right of the vehicle M may be added to the left-front lateral sensor 41*lf* and the right-front lateral sensor 41*rf*.

The left-rear lateral sensor 41*lr* and the right-rear lateral sensor 41*rr* are each constituted, for example, by a LiDAR sensor or a millimeter-wave radar. The left-rear lateral sensor 41*lr* and the right-rear lateral sensor 41*rr* are disposed, for example, on the left and right sides, respectively, of a rear bumper.

The left-rear lateral sensor 41*lr* and the right-rear lateral sensor 41*rr* detect three-dimensional objects that cannot be easily recognized by the left-front lateral sensor 41*lf* and the right-front lateral sensor 41*rf*. That is, by the left-rear lateral sensor 41*lr* and the right-rear lateral sensor 41*rr*, three-dimensional objects in areas Alr and Arr (see FIG. 2) behind and to the left and right of the vehicle M are recognized as traveling environment information.

Each radar analyzes light or wave reflected from objects and mainly detects a three-dimensional object, such as a vehicle running beside the vehicle M. As information about the three-dimensional object, each radar detects, for example, the width of the three-dimensional object, the representative point of the three-dimensional object (i.e., position relative to the vehicle M), and the moving speed of the three-dimensional object.

In the present embodiment, as described above, the left-front lateral sensor 41*lf*, the right-front lateral sensor 41*rf*, the left-rear lateral sensor 41*lr*, and the right-rear lateral sensor 41*rr* each serve as a traveling environment recognizing sensor that recognizes information about a traveling environment outside the vehicle M. The left-front lateral sensor 41*lf* and the right-front lateral sensor 41*rf* also constitute a forward environment recognizing device.

The coordinates of each object detected outside the vehicle M are transformed by the main_ECU 14 into coordinates in a three-dimensional coordinate system with the center of the vehicle M at its origin. The coordinates of each object detected outside the vehicle M are included in, for example, traveling environment information recognized by the image recognition_ECU 13, traveling environment information recognized by the locator unit 36, traveling environment information recognized by the left-front lateral sensor 41*lf*, traveling environment information recognized by the right-front lateral sensor 41*rf*, traveling environment information recognized by the left-rear lateral sensor 41*lr*, and traveling environment information recognized by the right-rear lateral sensor 41*rr*.

As driving modes, the main_ECU 14 has a manual driving mode, a first traveling control mode and a second traveling control mode for traveling control, and a minimum risk maneuver (MRM) mode. These driving modes can be selectively switched from one mode to another by the main_ECU 14 on the basis of, for example, an operation performed on the mode selection switch in the HMI 31.

The manual driving mode is a driving mode where the driver holds steering. For example, the manual driving mode is a driving mode that allows the vehicle M to travel in accordance with a driver's driving operation, such as steering operation, accelerator operation, or brake operation.

The first traveling control mode is also a driving mode where the driver holds steering. That is, the first traveling control mode is a so-called semi-autonomous driving mode that mainly combines, while reflecting a driver's driving operation, adaptive cruise control (ACC) with active lane keep centering (ALKC) control and active lane keep bouncing (ALKB) control appropriately in accordance with control by, for example, the E/G_ECU 22, the BK_ECU 24, and the PS_ECU 25 to allow the vehicle M to travel along a target traveling path.

The adaptive cruise control is basically performed on the basis of traveling environment information received from the image recognition_ECU 13. That is, the adaptive cruise control is performed on the basis of, for example, preceding vehicle information included in the traveling environment information from the image recognition_ECU 13.

The active lane keep centering control and the active lane keep bouncing control are basically performed on the basis of traveling environment information received from one or both of the image recognition_ECU 13 and the locator unit 36. That is, the active lane keep centering control and the active lane keep bouncing control are performed on the basis of, for example, lane line information included in the traveling environment information from the image recognition_ECU 13 or the locator unit 36.

The second traveling control mode is an autonomous driving mode where the driver does not hold steering and performs neither accelerator operation nor brake operation. That is, the second traveling control mode is an autonomous driving mode that mainly combines the adaptive cruise control with the active lane keep centering control and the active lane keep bouncing control appropriately in accordance with control by, for example, the E/G_ECU 22, the BK_ECU 24, and the PS_ECU 25 to allow the vehicle M to travel along a target route (router map information).

The minimum risk maneuver mode is a mode where if, for example, current traveling in the second traveling control mode becomes unable to continue and the driving operation cannot be passed to the driver, the vehicle M is automatically brought to a stop on a side strip of the road, with hazard lights on.

Passing the driving operation to the driver refers to, for example, transition to the manual driving mode or to the first traveling control mode.

As described above, the minimum risk maneuver mode is a control mode that allows the vehicle M to safely stop when the driving operation of the vehicle M cannot be passed from the system to the driver due to, for example, a drop in driver's alertness.

Figure 3:
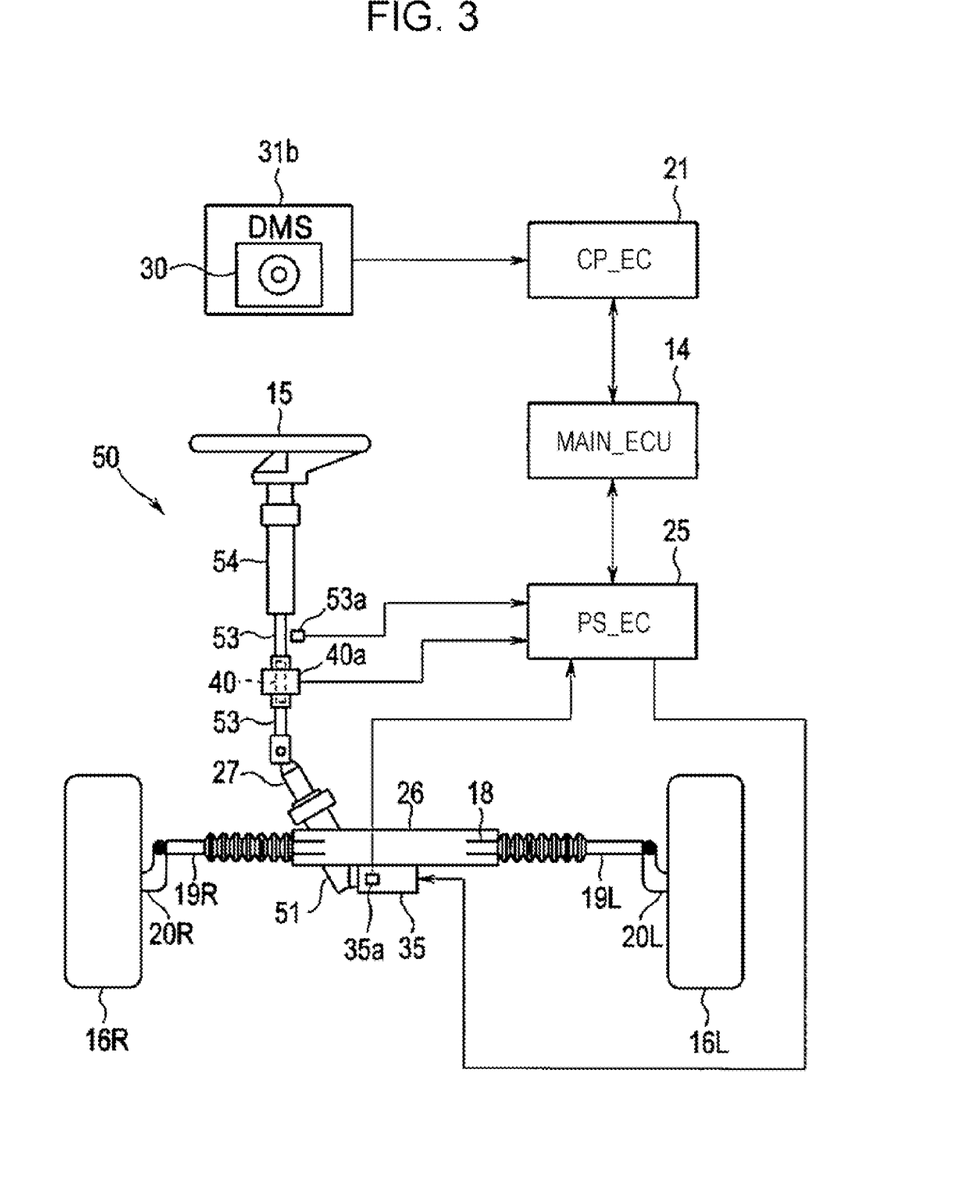
FIG. 3 is a schematic diagram illustrating a configuration of an electric power steering device and a driver monitoring system.

A steering mechanism of an electric power steering device 50 will now be described with reference to FIG. 3. The electric power steering device 50 is a steering device that is capable of controlling the steering angle through an actuator, independent of a steering input from the driver.

The electric power steering device 50 includes a steering shaft 53 that is freely rotatably supported by a body frame (not illustrated) of the vehicle M, with a steering column 54 therebetween.

The steering shaft 53 extends at one end thereof toward a driving seat, and extends at the other end thereof toward an engine room. A steering handle (steering wheel) 15 is secured to the one end of the steering shaft 53 adjacent to the driving seat. The steering angle sensor 53*a* is disposed on the outer periphery of the steering shaft 53 coupled to the steering handle 15.

The steering angle sensor 53*a* includes, for example, two sets of magnetoresistive elements that are capable of detecting the rotation of a magnet inside a detection gear. A reference rotational position of the steering handle 15 (e.g., a rotational position in the upper part of the steering handle 15 during travel of the vehicle M in a straight line) is determined in advance. On the basis of a magnetic change caused by rotation of the detection gear, the steering angle sensor 53*a* can detect the rotation angle (steering angle) and the rotation direction (steering direction) from the fixed reference position determined in advance.

A torsion bar 40 is disposed in the steering shaft 53. A pinion shaft 27 is coupled to the end of the steering shaft 53 extending toward the engine room. The steering torque sensor 40*a* is disposed on the outer periphery of the torsion bar 40.

The steering torque sensor 40*a* detects displacement between the steering handle 15 and the pinion shaft 27 generated around the steering shaft 53 by torsion of the torsion bar 40 to detect steering torque of the driver's steering.

A steering gear box 26 extending in the vehicle width direction is disposed in the engine room (not illustrated) of the vehicle M. A rack shaft 18 is inserted in, and supported by, the steering gear box 26 in such a way that it can freely reciprocate.

A pinion on the pinion shaft 27 engages with a rack (not illustrated) on the rack shaft 18 to form a rack and pinion steering gear mechanism.

The rack shaft 18 protrudes, at right and left ends thereof, from both ends of the steering gear box 26. Knuckle arms 20R and 20L are coupled to the respective ends of the rack shaft 18, with a tie rod 19R interposed between the knuckle arm 20R and the rack shaft 18 and a tie rod 19L interposed between the knuckle arm 20L and the rack shaft 18.

The knuckle arms 20R and 20L support wheels 16R and 16L serving as steering wheels in such a way that the wheels 16R and 16L can freely rotate. At the same time, the knuckle arms 20R and 20L are supported by the vehicle body frame to allow steering.

When the steering handle 15 is operated to rotate the steering shaft 53 and the pinion shaft 27, the rack shaft 18 moves in the right and left direction as the pinion shaft 27 rotates. The movement of the rack shaft 18 causes the knuckle arms 20R and 20L to pivot about a king pin shaft (not illustrated), so that the wheels 16R and 16L are turned in the right and left direction.

The pinion shaft 27 is coupled to the electric power steering motor 35, with an assist transmission mechanism 51 interposed therebetween. The assist transmission mechanism 51 is constituted, for example, by a deceleration gear mechanism. The electric power steering motor 35 serves as an actuator that enables assisting the driver's steering operation and automatic steering.

The electric power steering motor 35 is an electric motor constituted, for example, by a DC brushless motor that includes a stator secured to a case and a rotor rotating inside the stator. The rotation of the rotor of the electric power steering motor 35 is converted through the assist transmission mechanism 51 to axial motion of the rack shaft 18.

The electric power steering motor 35 includes a rotation angle sensor 35a that detects the rotation angle of the rotor. For example, the rotation angle sensor 35a is a sensor that detects, with a rotary encoder, the rotation angle of the rotor relative to a predetermined zero position. A signal from the rotation angle sensor 35a is received by the PS_ECU 25.

For example, when the ignition is turned on, a zero position based on the steering angle detected by the steering angle sensor 53a and the reduction ratio of the assist transmission mechanism 51 is set as a default for the rotation angle sensor 35a. Normally, the rotation angle detected by the rotation angle sensor 35a and the rotation angle of the steering handle 15 detected by the steering angle sensor 53a can be treated as the same steering angle.

The PS_ECU 25 is a control unit mainly composed of a microcomputer. The PS_ECU 25 drives and controls the electric power steering motor 35. The PS_ECU 25 receives signals from the steering angle sensor 53a, the steering torque sensor 40a, the rotation angle sensor 35a, and other sensors (not illustrated), such as a vehicle speed sensor for detecting a vehicle speed and a yaw rate sensor for detecting a yaw rate (or vehicle's rotation speed about the vertical axis), and also receives signals from switches (not illustrated).

The DMS 31b includes an in-vehicle camera 30. The in-vehicle camera 30 is mounted, for example, in a center visor on an instrument panel and configured to recognize the driver's face.

The DMS 31b receives driver information that includes, for example, the levels of drowsiness, alertness, and distraction determined on the basis of the conditions of driver's face and line of sight captured by the in-vehicle camera 30. The DMS 31b outputs the driver information to the CP_ECU 21.

While described in detail below, the driving support apparatus 1 configured as described above detects the driver's line-of-sight direction during execution of the active lane keep centering control, and changes the heaviness of the steering handle 15.

Figure 4:
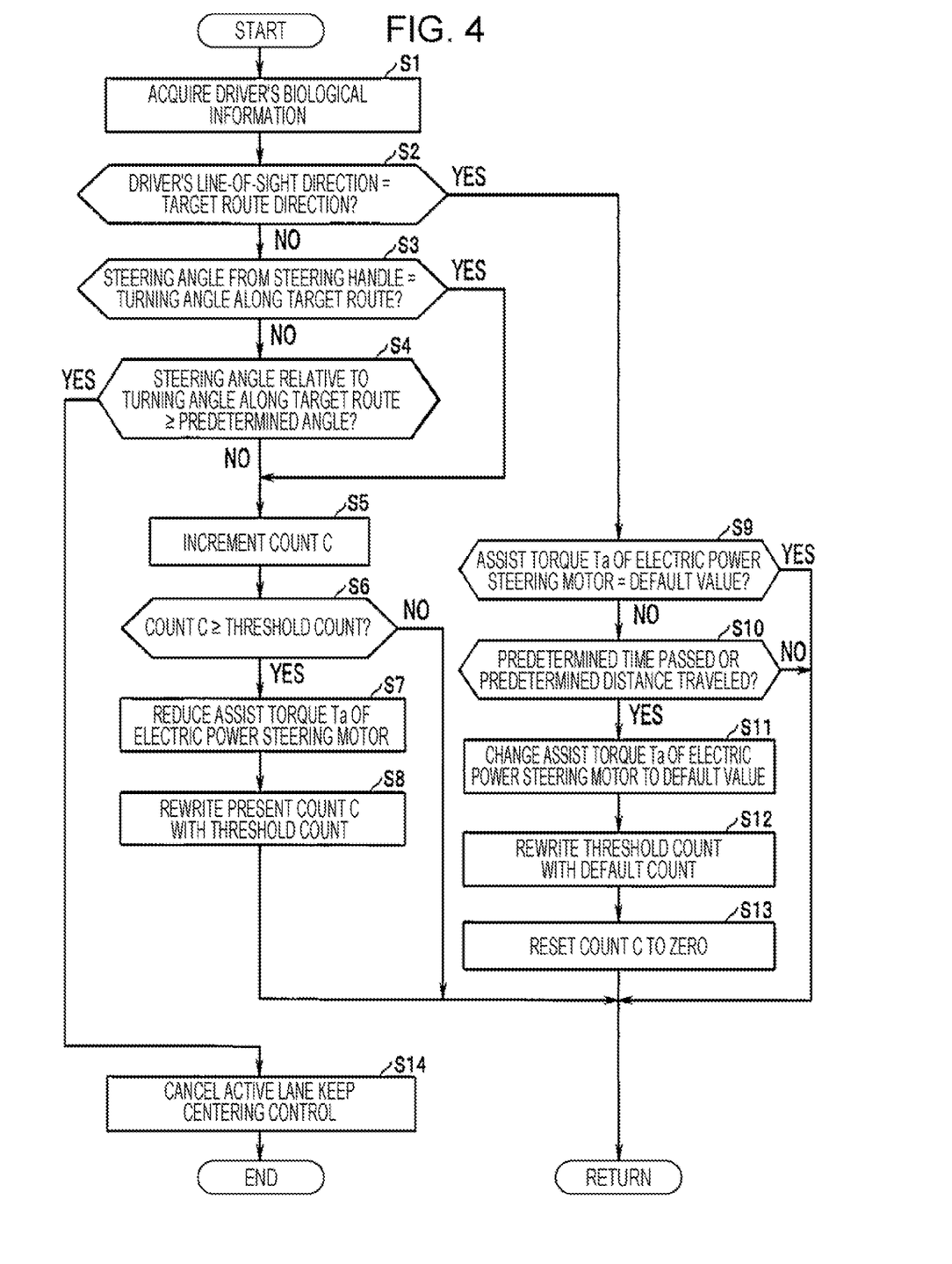
FIG. 4 is a flowchart illustrating an example of control executed by the vehicle driving support apparatus.

An example of control based on a routine illustrated in the flowchart of FIG. 4 will now be described. The control is executed by the driving support apparatus 1.

During the active lane keep centering control of the vehicle M, the main_ECU 14 of the driving support apparatus 1 acquires biological information of the driver (S1). Here, the main_ECU 14 acquires biological information of the driver output, for example, from the DMS 31b to the CP_ECU 21.

From the biological information of the driver, the main_ECU 14 determines whether the driver's line-of-sight direction is a target route direction of the vehicle M under the active lane keep centering control (S2). The main_ECU 14 compares the driver's line-of-sight direction with the target route direction of the vehicle M.

That is, from the biological information of the driver received from the DMS 31b, the main_ECU 14 detects the driver's line-of-sight direction on the basis of, for example, the direction of the driver's face and the driver's eye level captured by the in-vehicle camera 30. Then, the main_ECU 14 compares the driver's line-of-sight direction with the target route direction of the vehicle M.

The driver's line of sight may deviate from the target route of the vehicle M, as long as it is roughly within the range of the target route. The target route of the vehicle M is a route running in the center between lane lines that are computed, for example, on the basis of lane line information received from the image recognition_ECU 13.

If the driver's line-of-sight direction agrees with the target route direction of the vehicle M, the main_ECU 14 goes to step S9 (described below).

If the driver's line-of-sight direction does not agree with (or deviates from) the target route direction of the vehicle M, the main_ECU 14 determines whether the steering angle received from the steering handle 15 agrees with the turning angle along the target route (S3).

The main_ECU 14 compares the steering angle the PS_ECU 25 has received from the steering angle sensor 53a, with the turning angle the PS_ECU 25 has received from the rotation angle sensor 35a. The turning angle is for driving the electric power steering motor 35 along the target route. The main_ECU 14 then determines whether the steering angle agrees with the turning angle along target route of the vehicle M.

If the steering angle received from steering handle 15 agrees with the turning angle along the target route of the vehicle M, the main_ECU 14 goes to step S5 (described below).

If the steering angle received from the steering handle 15 does not agree with the turning angle along the target route of the vehicle M, the main_ECU 14 determines whether the steering angle received from the steering handle 15, relative to the turning angle along the target route, is greater than or equal to a predetermined angle (S4).

The main_ECU 14 determines whether the steering angle relative to the turning angle along the target route of the vehicle M is greater than or equal to the predetermined angle. If the steering angle relative to the turning angle is less than the predetermined angle, the steering handle 15 held by the driver is slightly moving. That is, the main_ECU 14 determines that the vehicle M is wandering.

If the steering angle received from the steering handle 15, relative to the turning angle along the target route, is less than the predetermined angle, the main_ECU 14 increments (by +1) a count C of, for example, an internal memory (S5). Even when, in step S3, the steering angle received from the steering handle 15 agrees with the turning angle along the target route of the vehicle M, the main_ECU 14 increments (by +1) the count C of the internal memory in step S5.

The count C is incremented when the driver's line-of-sight direction does not agree with (or deviates from) the target route direction of the vehicle M and, at the same time, either when the steering angle received from the steering handle 15 agrees with the turning angle along the target route of the vehicle M or when the steering angle relative to the turning angle is less than the predetermined angle.

That is, the count C is incremented when, for example, the driver is distracted from driving in the target route direction of the vehicle M. This also includes the case where the vehicle M is wandering on the target route.

Next, the main_ECU 14 determines whether the count C is greater than or equal to a predetermined threshold count (S6). The count C is the number of times the driver has looked away from the target route of the vehicle M (or has been distracted from driving). If the count C representing the number of times the driver has been distracted is less than the predetermined threshold count, the main_ECU 14 returns to step S1.

If the count C representing the number of times the driver has been distracted is greater than or equal to the predetermined threshold count, the main_ECU 14 reduces an assist torque Ta of the electric power steering motor 35 to a predetermined value (S7). This increases the amount of force the driver uses to turn the steering handle 15 by a predetermined degree. That is, reducing the assist torque Ta makes the steering handle 15 feel heavier to a predetermined degree.

Then, the main_ECU 14 rewrites the present count C with the threshold count (S8) and returns to step S1. This increments the threshold count (e.g., by +1) from the previous value. The increment of the threshold count may be determined in any manner.

If the driver's line-of-sight direction agrees with the target route direction (or the driver is not distracted) in step S2, the main_ECU 14 determines whether the assist torque Ta of the electric power steering motor 35 is a default value (S9). If the assist torque Ta of the electric power steering motor 35 is the default value, the main_ECU 14 returns to step S1.

If the assist torque Ta of the electric power steering motor 35 is not the default value, the main_ECU 14 determines whether a predetermined period of time has passed or the vehicle M has traveled a predetermined distance (S10). That is, if the assist torque Ta is not the default value, the main_ECU 14 determines in step S10 whether the predetermined period of time has passed or the vehicle M has traveled the predetermined distance since the driver became no longer distracted and the driver's line-of-sight direction agreed with the target route direction.

For example, the main_ECU 14 measures the passage of time with an internal timer, or computes the travel distance of the vehicle M on the basis of the location of the vehicle M measured by the GNSS sensor 37, vehicle speed, and travel time.

That is, step S10 is performed when the driver's line of sight is directed in the target route direction of the vehicle M and the assist torque Ta of the electric power steering motor 35 is not the default value. If the predetermined period of time has not passed or the vehicle M has not traveled the predetermined distance, the main_ECU 14 returns to step S1.

If the predetermined period of time has passed or the vehicle M has traveled the predetermined distance (whichever comes first), the main_ECU 14 changes the assist torque Ta of the electric power steering motor 35 to the default value (S11).

If the predetermined period of time has passed or the vehicle M has traveled the predetermined distance in the state where the driver's line of sight is directed in the target route direction of the vehicle M, the main_ECU 14 determines that the driver is not distracted. The operation of step S11 may be repeated to increment the assist torque Ta of the electric power steering motor 35 by a predetermined value, so that the assist torque Ta is returned stepwise toward the default value.

Then, the main_ECU 14 rewrites the threshold count with a default count (S12), resets the count C representing the number of times the driver has been distracted to zero (S13), and returns to step S1.

If, in step S4, the steering angle received from the steering handle 15, relative to the turning angle along the target route, is greater than or equal to the predetermined angle, the main_ECU 14 cancels the active lane keep centering control and terminates the present control routine (S14).

Here, the main_ECU 14 determines that the driver overrides the active lane keep centering control and intentionally drives the vehicle M off the target route.

As described above, if the driver's line of sight detected by the DMS 31*b* differs from the direction of steering under the active lane keep centering control, the driving support apparatus 1 of the vehicle M determines that the driver may currently be distracted.

That is, since the driver may erroneously steer the vehicle M off the normal traveling route (target route) under the active lane keep centering control, the driving support apparatus 1 of the vehicle M reduces the assist torque Ta of the electric power steering motor 35 to increase the steering torque for turning the steering handle 15.

The driving support apparatus 1 of the vehicle M repeats the routine from step S1 to step S8 described above. Each time the number of times the driver has been distracted is incremented, the driving support apparatus 1 of the vehicle M reduces the assist torque Ta of the electric power steering motor 35. The driving support apparatus 1 of the vehicle M executes control that increases the heaviness of the steering handle 15 stepwise to reliably alert the driver that he or she is being distracted.

Thus, during execution of the active lane keep centering control function, the driving support apparatus 1 of the vehicle M can prevent deviation from lane lines and clearly alert the driver that he or she is being distracted.

The ECUs 13, 14, and 21 to 25 in the driving support apparatus 1 of the vehicle M each include a processor that includes a central processing unit (CPU) and storage devices, such as a read-only memory (ROM) and a random-access memory (RAM). All or some components of circuits of the processor may be implemented by software. For example, various programs corresponding to functions, stored in the ROM, may be read and executed by the CPU.

All or some functions of the processor may be constituted by a logic circuit or an analog circuit, and various programs may be processed by an electronic circuit, such as a field-programmable gate array (FPGA).

The disclosure is not limited to the described embodiments, and may be variously modified in the implementation phase without departing from the scope of the disclosure. The embodiments described above include various stages of the disclosure, and various disclosures may be made by appropriately combining constituent elements disclosed herein.

For example, even if some constituent elements described in the embodiments are removed, the resulting components can still constitute the disclosure, as long as the problems described above can be solved and the effects described above can be achieved.

The invention claimed is:

1. A vehicle driving support apparatus comprising:
    a forward environment recognizing device configured to recognize a traveling environment forward of a vehicle;
    a control device configured to perform active lane keep centering control based on the traveling environment recognized by the forward environment recognizing device;
    an electric power steering device configured to apply an assist torque to control a turning angle of wheels of the vehicle in accordance with a steering angle received from a steering handle of the vehicle; and
    a driver monitoring system configured to detect biological information of a driver who drives the vehicle, wherein the control device is configured to:
        during performing the active lane keep centering control, count a number of times a line-of-sight direction of the driver in the biological information has deviated from a target route direction of the vehicle, and
        when the counted number of times is greater than or equal to a predetermined threshold count, reduce the assist torque of the electric power steering device stepwise as the counted number of times increases.

2. The vehicle driving support apparatus according to claim 1, wherein the control device is configured to rewrite the predetermined threshold count with the counted number of times, when the counted number of times is greater than or equal to the predetermined threshold count.

3. The vehicle driving support apparatus according to claim 2, wherein, when determining that a value of the assist torque is not a default value, the control device is configured to return the assist torque to the default value either after passage of a predetermined period of time since the line-of-sight direction agreed with the target route direction or after traveling of the vehicle by a predetermined distance since the line-of-sight direction agreed with the target route direction, and reset the counted number of times to zero.

4. The vehicle driving support apparatus according to claim 3, wherein the control device is configured to rewrite the predetermined threshold count with a default count.

5. The vehicle driving support apparatus according to claim 3, wherein the control device is configured to return the assist torque to the default value either after the passage of the predetermined period of time or after the traveling of the vehicle by the predetermined distance, whichever comes first.

6. A vehicle driving support apparatus comprising:
    a sensor configured to recognize a traveling environment forward of a vehicle;
    circuitry configured to perform active lane keep centering control based on the traveling environment recognized by the sensor;
    an electric power steering device configured to apply an assist torque to control a turning angle of wheels of the vehicle in accordance with a steering angle received from a steering handle of the vehicle; and
    a driver monitoring system comprising a sensor configured to detect biological information of a driver who drives the vehicle, wherein
    the circuitry is configured to:
        during performing the active lane keep centering control, count a number of times a line-of-sight direction of the driver in the biological information has deviated from a target route direction of the vehicle, and
        when the counted number of times is greater than or equal to a predetermined threshold count, reduce the assist torque of the electric power steering device stepwise as the counted number of times increases.

* * * * *